(12) United States Patent
Yang et al.

(10) Patent No.: US 7,554,761 B2
(45) Date of Patent: Jun. 30, 2009

(54) OPEN LOOP KA CALIBRATION WITH LOW FREQUENCY COMPENSATION

(75) Inventors: Lingzhi Yang, Firestone, CO (US); David Louis Schell, Fort Collins, CO (US); Sandeep D. Sequeira, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/818,042

(22) Filed: Jun. 13, 2007

(65) Prior Publication Data

US 2008/0130162 A1     Jun. 5, 2008

Related U.S. Application Data

(60) Provisional application No. 60/813,290, filed on Jun. 13, 2006.

(51) Int. Cl.
    *G11B 5/596* (2006.01)
(52) U.S. Cl. .................................. 360/78.09; 360/78.06
(58) Field of Classification Search ....................... None
    See application file for complete search history.

(56) References Cited

U.S. PATENT DOCUMENTS

| | | | | |
|---|---|---|---|---|
| 5,550,685 | A  * | 8/1996  | Drouin      | 360/77.08 |
| 5,684,650 | A    | 11/1997 | Kadlec et al. | 360/77.06 |
| 5,914,829 | A    | 6/1999  | Kadlec et al. | 360/78.04 |
| 6,347,018 | B1   | 2/2002  | Kadlec et al. | 360/77.08 |
| 6,614,615 | B1 * | 9/2003  | Ju et al.   | 360/78.04 |
| 6,741,417 | B2   | 5/2004  | Hsin et al. | 360/78.05 |
| 6,934,116 | B2 * | 8/2005  | Iwashiro    | 360/78.04 |
| 6,963,466 | B2 * | 11/2005 | Baum et al. | 360/77.04 |
| 7,049,781 | B2   | 5/2006  | Maiocchi et al. | 318/609 |
| 7,359,140 | B2 * | 4/2008  | Chung       | 360/78.06 |

* cited by examiner

*Primary Examiner*—K. Wong
(74) *Attorney, Agent, or Firm*—David D. Brush; Westman, Champlin & Kelly P.A.

(57) ABSTRACT

A method of calibrating an actuator controller is discussed. The method includes using an open loop seek operation and compensating for a low frequency response to reduce the velocity at the end of the open loop seek operation.

18 Claims, 9 Drawing Sheets

OPEN LOOP KA CALIBRATION WITH LOW FREQUENCY COMPENSATION

CROSS REFERENCE TO CO-PENDING APPLICATION

This application claims priority benefits from U.S. provisional patent application Ser. No. 60/813,290, filed Jun. 13, 2006 and entitled "OPEN LOOP Ka CAL".

FIELD OF THE DISCLOSURE

The present disclosure relates generally to control systems, and more particularly but not by limitation, to actuator controllers such as those used for data storage systems.

BACKGROUND

Data storage systems including data storage media such as disc drives are commonly used in a wide variety of devices to store large amounts of data in a form that can be made readily available to a user. While commonly used in computing devices such as personal computers, workstations, and laptops, disc drives have also been incorporated into personal music devices and in other applications.

In general, a disc drive includes one or more storage discs that are rotated by a spindle motor. The surface of each of the one or more storage discs is divided into a series of data tracks. The data tracks are spaced radially from one another across a band having an inner diameter and an outer diameter. The data tracks extend generally circumferentially around the disc and can store data in the form of magnetic transitions within the radial extent of a given track. An interactive element, such as a magnetic transducer, is used to sense the magnetic transitions to read data from the given track. In addition, the interactive element can transmit an electric signal that causes a magnetic transition on the disc surface to write data to the given track.

The interactive element is mounted to an arm of an actuator. The interactive element is then selectively positioned by a control system that causes the actuator arm to be positioned over a given data track of the disc to either read data from or write data to the given data track of the disc, as the disc rotates adjacent the transducer. The actuator arm is typically mounted to a voice coil motor that can be controlled by the control system to move the actuator arm relative to the disc surface.

The nature of disc drives is such that it is advantageous to be able precisely position the interactive element in a desired position to read or write data. Typical servo actuator control systems include a number of different control stages, including a seek stage, a settle stage, and a track following stage. Each control stage is designed to perform a particular function related to the control of the position of the interactive element depending upon the desired positioning action at a particular time. For example, the seek stage is designed to move the interactive element from one location to another, such as when it is desired to read data from or write data to a particular track. The settle stage is designed to stabilize the actuator after a seek action has been performed and transition the control system to the track following stage. The track following stage is typically designed to cause the interactive element to follow the particular track over which it is positioned.

During the manufacture of disc drives, it can be advantageous to calibrate the control system to reduce positioning error that may occur due to a variety of factors, including variability of components and/or manufacturing processes from one control system to the next. For example, calibrating the control system during the seek stage typically provides for more accurate seek operations, which, in turn, provides for more efficient operation of the disc drive system.

SUMMARY

In one illustrative embodiment, a method of calibrating an actuator controller in an open loop seek operation is discussed. The method includes compensating for a low frequency response to reduce the velocity at the end of the open loop seek operation.

In another illustrative embodiment, an actuator control circuit is discussed. The actuator control circuit receives an input signal and provides a signal having an adjustable gain indicative of a nominal acceleration constant to control the position of the actuator. The circuit is configured to calibrate the actuator control in an open loop seek operation by compensating for low frequency response.

In still another illustrative embodiment, a method of applying a nominal acceleration constant to an input signal for an actuator is discussed. The method includes tuning the acceleration constant during an open loop control operation to compensate for low frequency response of the actuator.

These and other features and benefits that characterize embodiments of the present invention will be apparent upon reading the following detailed description and review of the associated drawings.

DETAILED DESCRIPTION

Embodiments of the present discussion provided below refer to a magnetic disc drive. One skilled in the art recognize that the embodiments may also be applied to any data storage device, such as an optical disc drive, a magneto-optical disc drive, or other data storage device having one or more heads for accessing data on one or more storage media devices. The embodiments discussed below may also be applied to non-data storage applications including those that have a controller to control the position of actuator.

Figure 1:
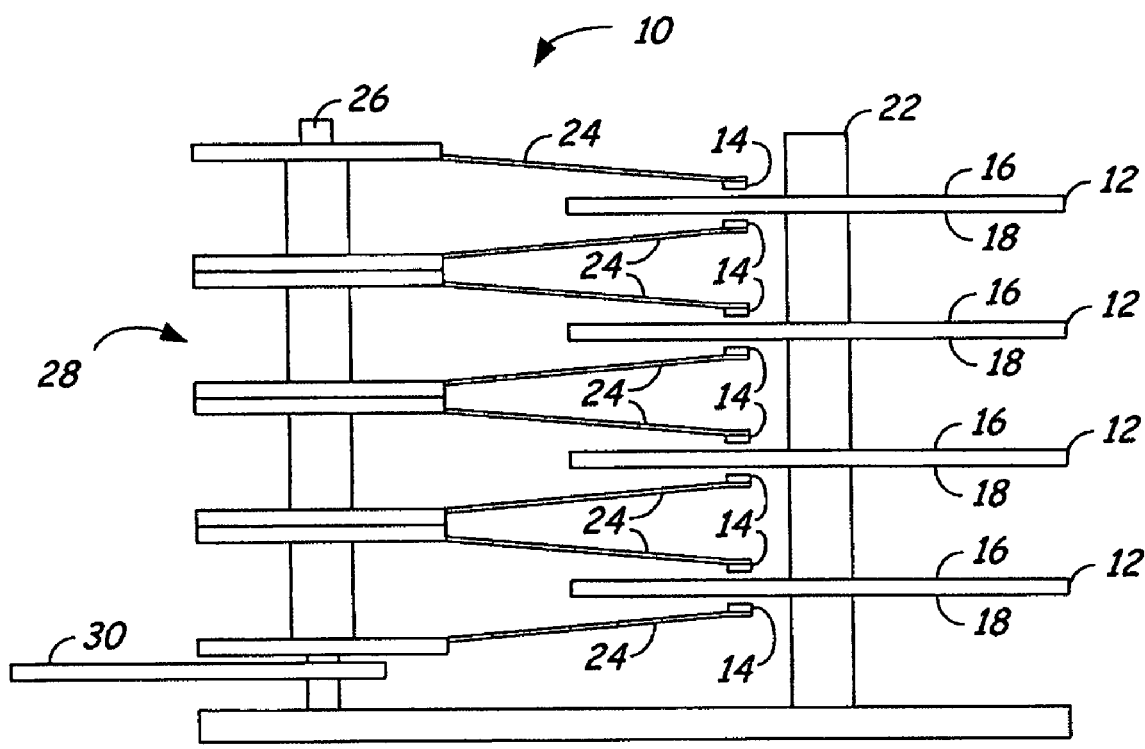
FIG. 1 is a side elevation view of an exemplary schematic diagram of a disc drive system of the type that the controllers of the current discussion can be usefully employed.

FIG. 1 provides a schematic diagram of an exemplary disc drive system 10. The disc drive system 10 includes one or more data storage discs 12 and one or more interactive elements 14, which, in the illustrated example, are transducers such as read and/or write heads. Each of the one or more storage discs 12 has a first surface 16 and a second surface 18 that opposes the first surface 16. Each of the first and second surfaces 16 and 18 includes a plurality of radial data tracks (not shown in FIG. 1) to store user data. In one illustrative embodiment, an interactive element 14 is provided for each of the first and second surfaces 16 and 18 of each of the one or more storage discs 12 such that data can be read from or written to the data tracks of all of the storage discs 12. The interactive elements 14 are coupled to a read/write control 50 (shown schematically in FIG. 2), which illustratively sends and receives signals to/from the interactive elements 14 as part of the reading and writing of information between the interactive elements 14 and the storage discs 12. It should be understood that the disc drive 10 is merely representative of a disc drive system utilizing the present embodiments and that the present embodiments can be implemented in a disc drive system including more or fewer storage discs.

The one or more storage discs 12 are illustratively mounted for rotation by a spindle motor arrangement 22. In addition, each of the interactive elements 14 is supported by a respective actuator arm 24 for controlled positioning over pre-selected radii of the storage discs 12 to enable the reading and writing of data from and to the radial data tracks. In this example, the actuator arms 24 are rotatably mounted on a pin 26. The actuator arms 24 are illustratively fixed in position with respect to each other so that, when they rotate about pin 26, each of the actuator arms 24 rotate together. The actuator arms 24 collectively form an actuator arm assembly 28. In addition, a voice coil motor 30 is rotatably mounted to the pin 26 and is operable to receive a signal from voice coil motor (VCM) controller (48 as shown in FIG. 2) to cause the actuator arm assembly 28 to rotate about pin 26 so that each of the interactive elements 14 can be radially positioned adjacent to the surfaces 16 and 18 of the discs 12 along any portion of the surfaces 16 and 18 that have data tracks.

Figure 2:
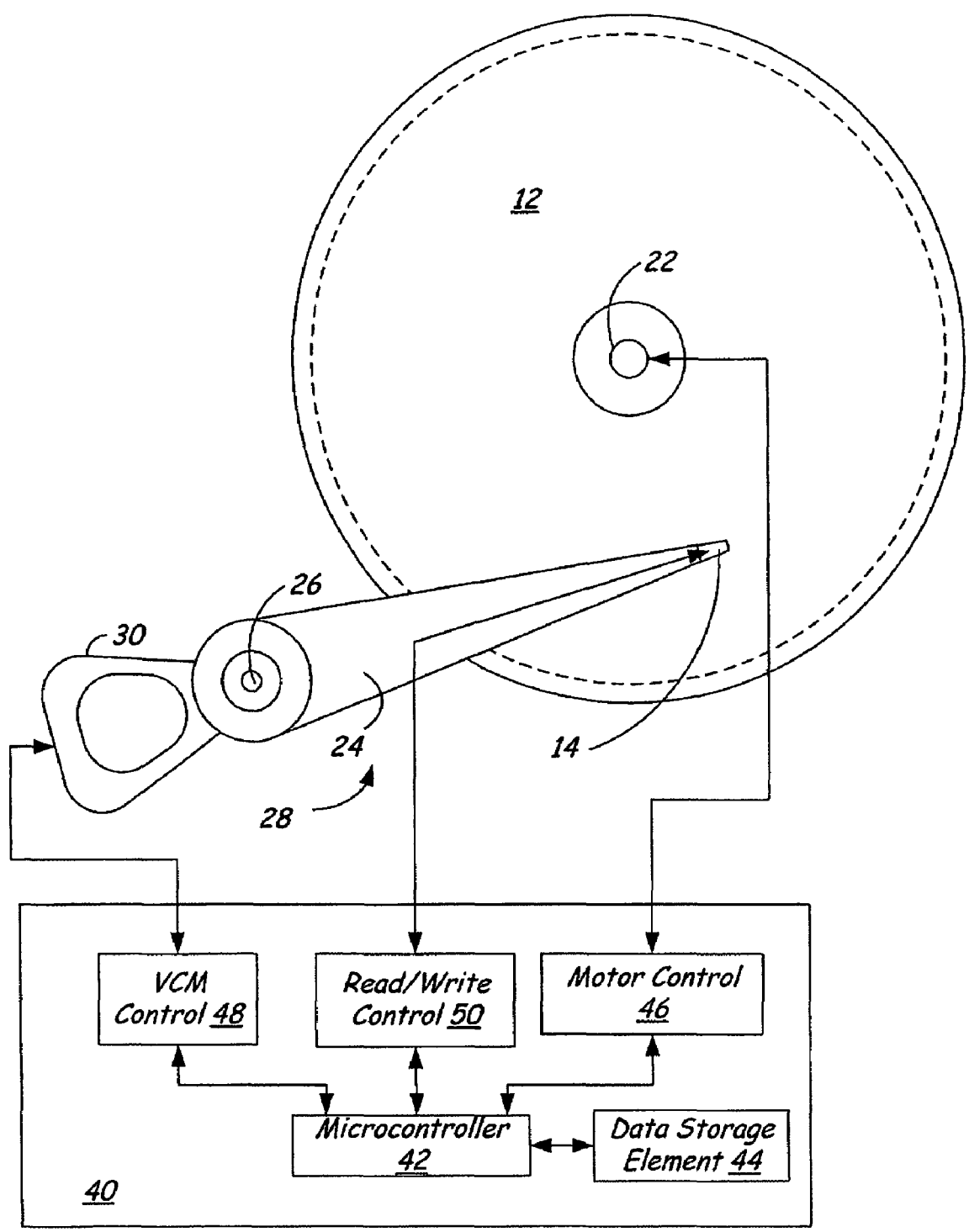
FIG. 2 is a block diagram of a controller for an actuator configured to control positioning of an actuator arm shown in a top view and of the type illustrated in FIG. 1.

Referring now to FIG. 2, there is illustrated, in schematic form, a top view of the disc drive system 10 and further illustrating a control system 40 in communication with various other components of the disc drive system 10. The control system 40, in one illustrative embodiment, includes a microprocessor 42 coupled to a data storage element 44. Data storage element 44 can include random access memory, read only memory, or any other type of data storage device or combination of different types of such devices that the microprocessor 42 can access for executing instructions to control the position of the actuator arm assembly 28.

Microprocessor 42 is coupled to a motor control 46, which provides a signal to the spindle motor arrangement 22 to control the rotational movement of the one or more storage discs 12. In addition, the microprocessor 42 is coupled to the VCM controller 48. The VCM control 48 provides a signal to control to the voice control motor 30 to cause actuator arm assembly 28 to rotate to a desired position. Further, the microprocessor 42 is illustratively in electrical communication with an interactive element read/write control 50, which receives and send signals to and from the interactive elements 14, which, as described above, are associated with reading data from and/or writing data to the one or more storage discs 12.

During the course of operation of the disc drive system, situations will arise when data is to be read from or written to a data track on one of the storage discs 12 other than the data track that is positioned adjacent to the read/write interactive element 14 positioned adjacent the particular storage disc 12, thereby necessitating that the interactive element 14 be moved into a different position relative to the storage disc 12. Microprocessor 42 determines the current radial position of the read/write interactive elements 14 and the radial position of the data track where the read/write interactive elements 14 are to be relocated. The microprocessor 42 then implements a routine that provides signals via the VCM controller 48 to the voice coil motor 30 to cause the actuator arm assembly 28 to move to the desired location.

The routine that the microprocessor 42 uses to control the rotation of the actuator arm assembly 28 and therefore the control routine used to position of the interactive elements 14 includes several different stages, as described above, including a seek stage. During the seek stage, a control routine employed by the microprocessor 42 has, as a primary objective, causing the movement of the actuator arm assembly 28 properly position the interactive elements 14 as quickly as possible. As such, the seek stage control is illustratively performed in an open loop configuration. The control routine employed by the microprocessor 42 is illustratively calibrated to reduce position error during the seek stage operation and to optimize the track follow stage operation to the design point. Calibration provides an advantageous method of accounting for variability from one disc drive to another, while allowing for the use of a near open loop feed-forward control to move the actuator arm as quickly as possible while still maintain accurate position reference tracking.

Figure 3:
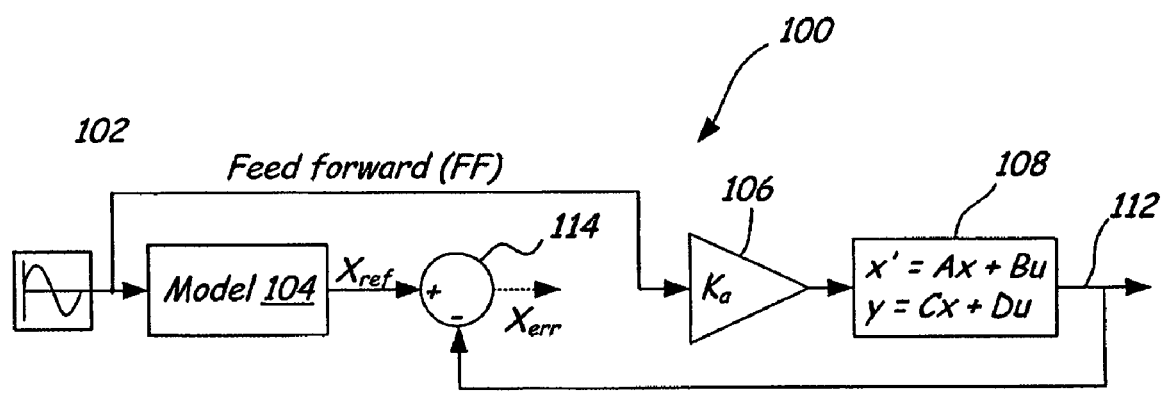
FIG. 3 illustrates a functional block diagram of a calibration system capable of being employed to calibrate the controller illustrated in FIG. 2 according to one illustrative embodiment.

Referring to FIG. 3, a functional block diagram of a calibration system 100 is shown. Calibration system 100 is capable of being used to perform calibration of an acceleration value $K_a$ for a control system employed by, for example, a seek stage of control system 40, illustrated in FIG. 2 and described above, according to one illustrative embodiment. The acceleration value $K_a$ is illustratively employed to account for any variation in control system 40 as it controls the position of interactive elements 14. The calibration system 100, is illustratively a stand alone control system capable of being placed in electrical communication with disc drive system 10 to operate the disc drive system 10 for the purposes of calibrating the disc drive system 10. The acceleration value $K_a$ can then be provided to the data storage element 44 of control system 40. Alternatively, the calibration system 100 is integrated into the control system 40 and is utilized to perform a self-calibration.

Calibration system 100 includes a model 104, which in one illustrative embodiment is described as $$\frac{k_{lump\_n}}{s^2}.$$

Model 104 receives an input signal 102 and provides as an output $X_{ref}$. The $X_{ref}$ output is a desired position of an interactive element 14 (illustrated in FIG. 2), given the input signal 102. The selection of $k_{lump\_n}$, a value which represents a nominal performance of control system 40 to position interactive element 14, will be discussed in more detail below.

The input signal 102 is also provided to as a feed forward signal to a variable gain amplifier 106, which is used to control the actual position of the interactive element 14. An output of the variable gain amplifier 106 is provided to a power amplifier and plant 108, which is used to move the interactive element 14 into a position, as is indicated by position signal 112. In one illustrative embodiment, the variable gain amplifier 106 and power amplifier and plant 108 approximate the VCM control 48 and the VCM 30 and the arm assembly 28 of control system 40. Alternatively, when calibration system 100 is integral to the control system 40, the variable gain amplifier 106 and power amplifier and plant 108 are the VCM control 48 and the VCM 30 and the arm assembly 28 of control system 40.

The position signal 112 is illustratively fed back to a comparator 114. The comparator 114 compares the position signal 112 against $X_{ref}$. The difference between the position signal 112 and the $X_{ref}$ signal is identified as $X_{err}$. Using the calibration system 100, the disc drive system 10 is calibrated by adjusting the $K_a$ value until $X_{err}$ is zero, that is, until $$K_a * \text{Plant}(s) = \frac{k_{lump\_n}}{s^2}.$$

In some instances, however, control systems 40 for disc drive systems 10 of the type illustrated in FIG. 1 can not necessarily calibrated simply by adjusting the $K_a$ value as suggested by the calibration system 100. It has been discovered that other factors may affect the disc drive system 10 so that when the disc drive system 10 is calibrated using the calibration system 100, the disc drive system 10 may not move the interactive elements 14 to the proper position at the end of a seek stage.

Figure 4:
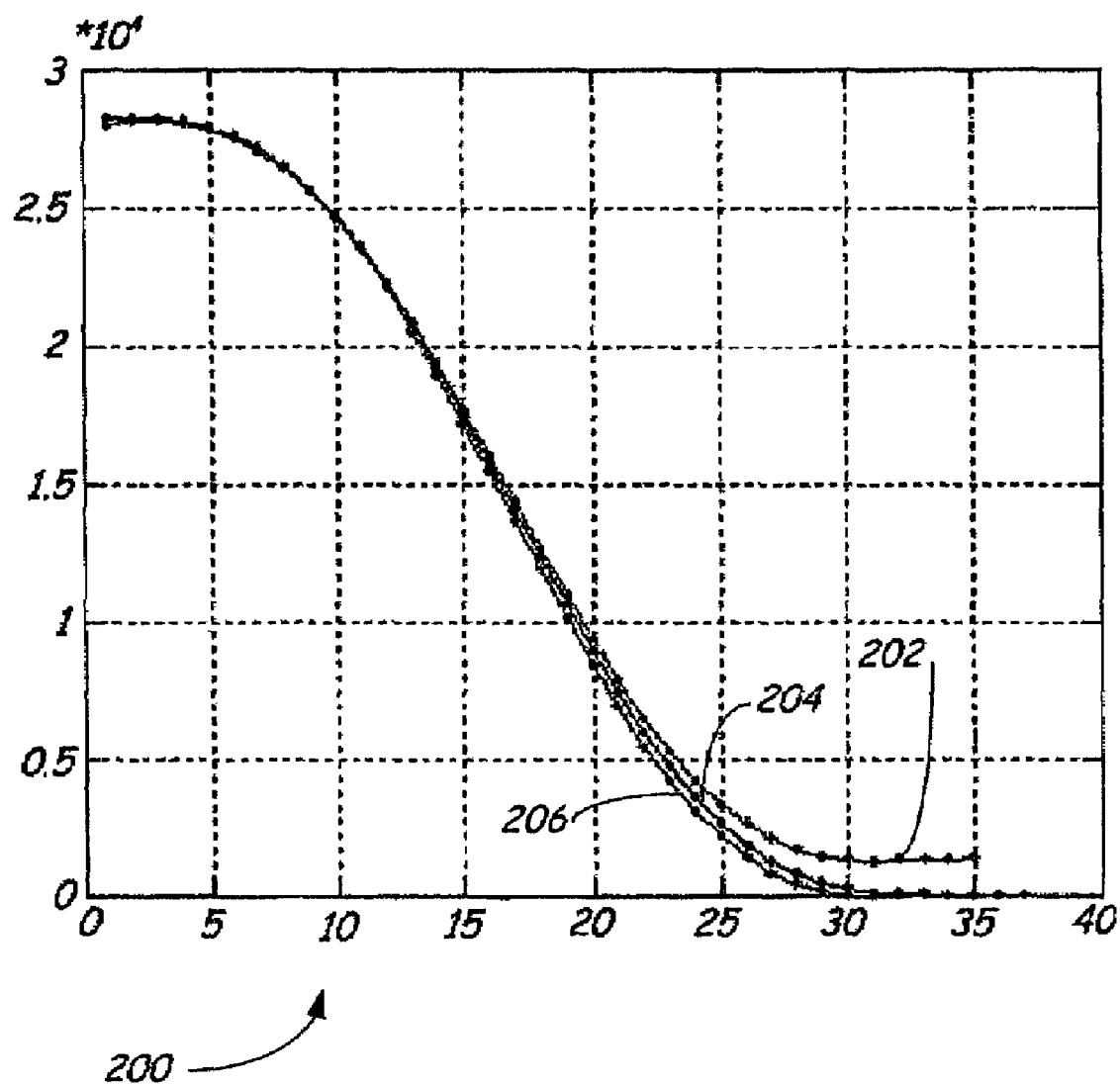
FIG. 4 is a graph illustrating the results of applying an open loop seek signal to a disc drive system calibrated with the calibration system of FIG. 3 as compared to desired results.

A first experiment was conducted on a disc drive system 10 as calibrated by calibration system 100. Results from the first experiment are shown in FIG. 4, which illustrates a position profile 200 of an interactive element 14 over the course of an open loop seek provided by a control system 40. Control system 40 was previously calibrated using calibration system 100. The position profile includes an actual position 202, which illustrates the position of the interactive element 14. The actual position 202 is compared to results predicted by the model 104. The position profile 200 includes an $X_{ref}$ signal 204 generated by a sample system and an $X_{ref}$ signal 206 generated by a continuous system. The two $X_{ref}$ signals 204 and 206 are compared against the actual position signal 202 of an open loop seek at the end of an open loop seek of 120 tracks. A position error 208 is the difference between sampled $X_{ref}$ signals 204 and the actual position signal 206, and is illustratively shown to be five tracks instead of the expected zero tracks. The open loop seek was performed in both directions with the same amount of $X_{err}$, which suggests that the position error 208 is not caused by bias error. Thus, the open loop seek performed by the calibrated disc drive system resulted in a positioning of the interactive element 14 five tracks away from the expected position.

Figure 5:
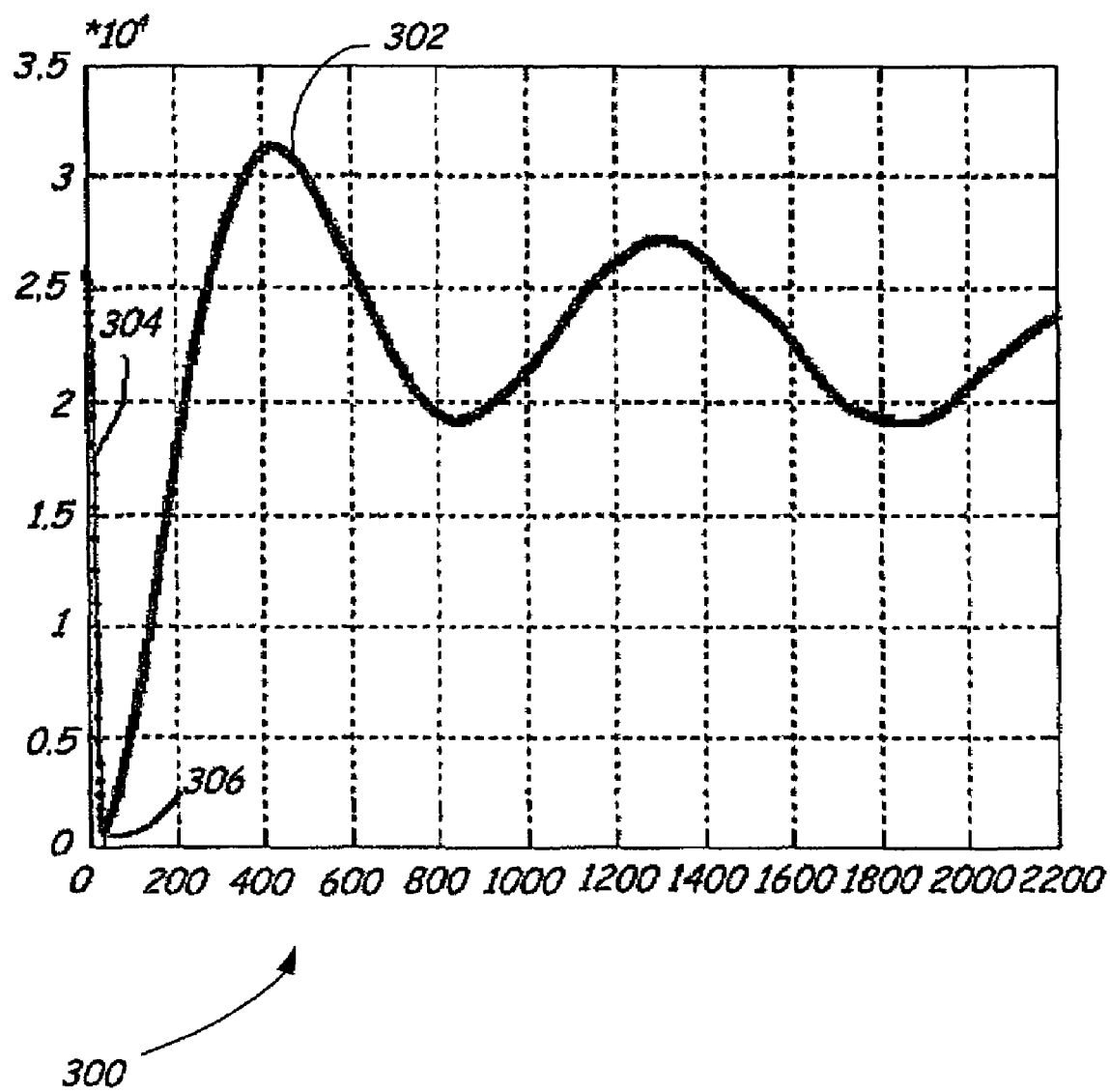
FIG. 5 is a graph illustrating the results of applying an open loop seek signal to a disc drive system calibrated with the calibration system of FIG. 3 and then removing the open loop seek signal to allow the actuator arm to float freely without control.

To better understand the nature of the errors above, results from a second experiment are shown in FIG. 5, which illustrates a position profile chart 300 of an open loop seek followed by ten revolutions of open loop floating without a track following control being enforced applied to a disc drive system 10. Position profile 300 includes an output curve 302, which indicates the position of an interactive element 14 of disc drive system 10 over the time of the signal applied as described above. A first portion 304 of the output curve 302 illustrates the changing position of the interactive element 14 while a open loop seek command is applied to the disc drive system 10. The first portion 304 of the output curve 302 shows that while the open loop seek command is applied, the interactive element moves toward a target track (represented as "0" on the position profile chart 300). This is consistent with the curve shown in FIG. 4. At point 306, the open loop seek command is illustratively removed from disc drive system 10. Note also that after the open loop seek command is removed, no signal is applied that represents either the settle or track following stages. Once the open loop seek command is removed, the output curve 302 illustrates that the interactive element 14 tends to release back toward a start track. In addition, the position of the interactive element 14 illustratively rings at around 30 Hz, with a damping ratio of about 0.1. This suggests that when a disc drive performs a short seek, calibrating the $K_a$ constant to match the simple $$\frac{k_{lump\_n}}{s^2}$$

model does not necessarily provide an optimum calibration for the control system 40. That is, it does not compensate for some losses incurred in the operation of the disc drive system 10.

Figure 6:
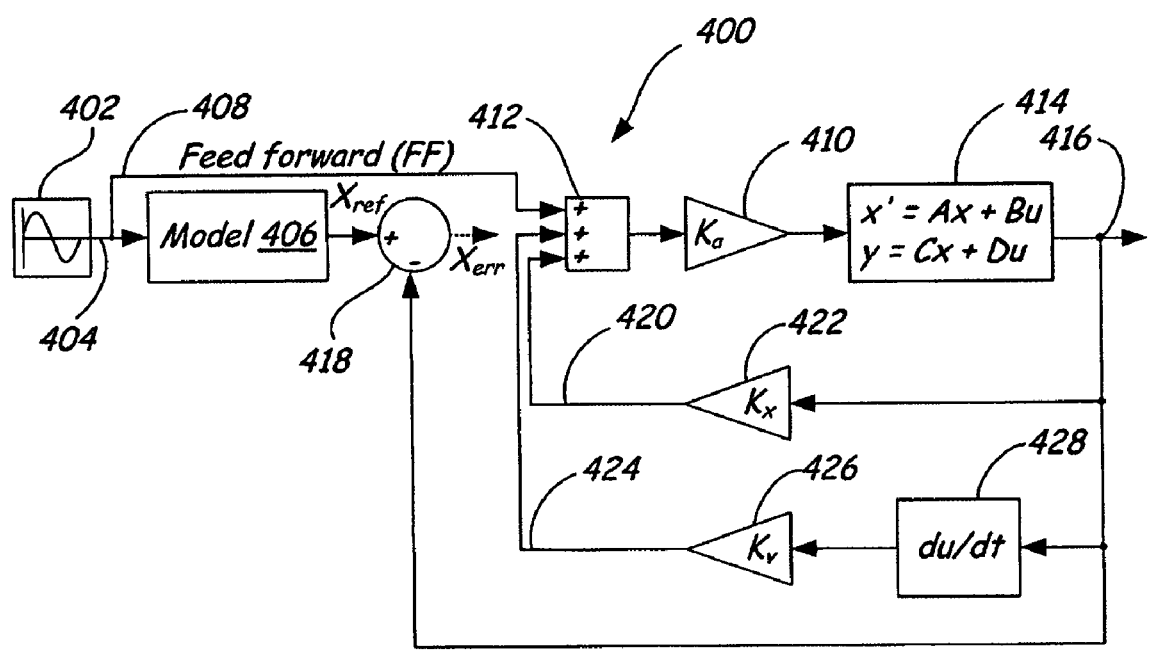
FIG. 6 illustrates a functional block diagram of a calibration system capable of being employed to calibrate the controller illustrated in FIG. 2 according to another illustrative embodiment.

Referring to FIG. 6, a functional block diagram of an exemplary calibration system 400 is illustrated. Calibration system 400 is illustratively designed so as to perform calibration of the acceleration constant $K_a$ while compensating for the losses mentioned above. As discussed above with respect to calibration system 100, calibration system 400 can be a stand alone control system that is employed to calibrate disc drive system 10 or alternatively integrated into control system 40 (illustrated in FIG. 2).

The calibration system 400 illustratively includes an input signal generator 402, which provides an input signal 404 to a model 406, which is selected as $$\frac{k_{lump\_n}}{s^2}.$$

It should be noted, however, that while the $$\frac{k_{lump\_n}}{s^2}$$

model provides an ideal position for the interactive elements 14, given the input 404, it does not accurately represent the actual position of the interactive elements 14 of the disc drive system 10 at low frequency because of losses in the disc drive system 10 as discussed above. Model 406 receives the input signal 404 and calculates a desired position $X_{ref}$ of an interactive element 14 of a disc drive system 10 when provided the input signal 404 over time. The input signal 404 of calibration system 400 is thus illustratively provided as a feed forward (FF) signal 408 to a variable gain amplifier 410 via a summer 412. The variable gain amplifier 410 provides an output to a power amplifier and plant 414. The power amplifier and plant 414 provides a position output 416, which indicates the actual position of the interactive element 14. The feed forward (FF) signal 408 is illustratively combined with feedback signals from the plant 414 at the summer 412. The feedback signals advantageously provide information during the calibration process that account for the losses illustrated in FIGS. 4 and 5 that are not accounted for in the model 406. The feedback signals provide low frequency response compensation and will be discussed in more detail below.

In addition, the position output 416 of the power amplifier and plant 414 is provided, along with an output from model 406, to a comparator 418. The position output 416 is thus illustratively compared against $X_{ref}$. The output $X_{err}$ of the comparator 418 is illustratively the difference between the position output 416, which, as is discussed above, is indicative of the actual position of the interactive element 14 of disc drive system 10 and $X_{ref}$, which is indicative of a desired position of the interactive element 14 as modeled by model 406.

As discussed above, system 400 includes feedback signals that are added to the feed forward (FF) signal 408 at the summer 412 prior to being provided to the power amplifier 410 to compensate for low frequency losses in the disc drive system 10. A position feedback signal 420 is added to the FF signal 408 to provide a position compensation for the position output 416. Position feedback signal 420 is illustratively the output of an amplifier 422 with a gain of $K_x$. Amplifier 422 receives the position output 416 and multiplies the position output 416 by $K_x$ to provide position feedback signal 420. Details regarding the calculation of $K_x$ will be provided below.

In addition to the position feedback signal 420, a velocity feedback signal 424 is illustratively provided to the summer 412 to compensate for losses due to the effects of velocity in the disc drive system 10. Velocity feedback signal 424 is illustratively the output of an amplifier 426 with a gain of $K_v$. Position output 416 is provided to a differentiator 428, which derives a velocity signal from the position output and provides the velocity signal to the amplifier 426.

Although model 406 is illustratively modeled as $$\frac{k_{lump\_n}}{s^2},$$

as discussed above, the feedback signals 420 and 424 indicate that $K_a$ is effectively calibrated to a different model. In fact, the data in FIGS. 4 and 5 suggest that $K_a$ should be modeled as $$\frac{k_{lump\_n}}{s^2 + 2\xi\omega s + \omega^2},$$

where $\xi$ is the damping ratio and $\omega$ is the natural frequency of the system. The following relationship is thus provided:

$$\frac{X_{ref}}{FF(s)} = \frac{K_{lump\_n}}{s^2 + 2\xi\omega s + \omega^2}$$

This can be described in the time domain as $$X_{ref}''(t) + 2\xi\omega X_{ref}'(t) + \omega^2 X_{ref}(t) = k_{lump\_n} FF(t) \quad (1)$$

Rearranging, we have $$X_{ref}''(t) = k_{lump\_n} FF(t) - 2\xi\omega X_{ref}'(t) - \omega^2 X_{ref}(t).$$

Equation (1) above can be rewritten as $$X_{ref}''(t) = k_{lump\_n}\left(FF(t) - \frac{2\xi\omega}{k_{lump\_n}} X_{ref}'(t) - \frac{\omega^2}{k_{lump\_n}} X_{ref}(t)\right) \quad (2)$$

Taking the LaPlace transform from both sides and rearranging the equation, we have:

$$\frac{X_{ref}(s)}{FF(s) - \frac{2\xi\omega}{k_{lump\_n}} V_{ref}(s) - \frac{\omega^2}{k_{lump\_n}} X_{ref}(s)} = \frac{k_{lump\_n}}{s^2} \quad (3)$$

Thus, it is illustrated that when using $$\frac{k_{lump\_n}}{s^2}$$

as a model 406 for calibrating $K_a$, system 400 advantageously includes additional compensation as described by the co-efficients shown in the equation above for the for the $V_{ref}$ (which is a velocity term) and $X_{ref}$ terms. By referring to equation (3), it can be seen that the $V_{ref}$ term has a co-efficient $K_v$ of $$\frac{2\xi\omega}{k_{lump\_n}}$$

and the $X_{ref}$ term has a coefficient $K_x$ of $$\frac{\omega^2}{k_{lump\_n}}.$$

Considering the unit conversion for sample system, it is trivial to show $K_v$ can be expressed as $$\frac{2\xi\omega}{k_{lump\_n} f_s},$$

and $K_x$ can be expressed as $$\frac{\omega^2}{k_{lump\_n} f_s^2}.$$

Since the sampling frequency $f_s$ is several orders of magnitude larger than $\omega$, it can be assumed that the coefficient $K_x$ of the $X_{ref}$ term is very small. Omitting the $K_x$ term from equation (2), we have:

$$\ddot{X}(t) = k_{lump\_n}\left(FF(t) - \frac{2\xi\omega}{k_{lump\_n}}\dot{X}(t)\right).$$

By integrating both sides of the equation over the period T of the open loop seek, we have:

$$\int \ddot{X}(t)dt = k_{lump\_n}\left(\int FF(t)dt - \int \frac{2\xi\omega}{k_{lump\_n}}\dot{X}(t)dt\right)$$

Thus, $$\dot{X}(T) = k_{lump\_n}\left(0 - \frac{2\xi\omega}{k_{lump\_n}}X(T)\right)$$

Because velocity is the derivative of the position function, we have:

$$V(T) = -\frac{2\xi\omega}{k_{lump\_n}}X(T).$$

Therefore, $$k_v = \frac{2\xi\omega}{k_{lump\_n}} = \frac{V(T)}{X(T)*k_{lump\_n}}.$$

For a sample system, we have $$k_v = \frac{2\xi\omega}{k_{lump\_n}f_s} = \frac{V(T)}{X(T)*k_{lump\_n}}$$

V(T) is the velocity at the end of the open loop seek operation and X(T) is the actual distance that the interactive element 14 has traveled at the end of the open loop seek operation.

Because the goal of the $K_v$ term is to compensate for the velocity response (and the goal of the $K_x$ term is to compensate for position response) at low frequency, the system 400 can be adaptively tuning by adjusting $K_v$ and/or $K_x$ until the velocity and position at the end of the open loop seek reaches zero. The $K_v$ and $K_x$ terms can be adjusted by manipulating the damping ratio $\xi$ and/or the natural frequency $\omega$ terms. Alternatively, the $K_v$ and $K_x$ terms can be iteratively adjusted. It should be appreciated that model 104 of calibration system 100 can be modeled as $$\frac{k_{lump\_n}}{s^2 + 2\xi\omega s + \omega^2}$$

to incorporate the velocity and position terms into it and thereby attain the improved low frequency model as is done in the calibration system 400 without adding velocity and/or position terms to feed forward input 408.

Figure 7:
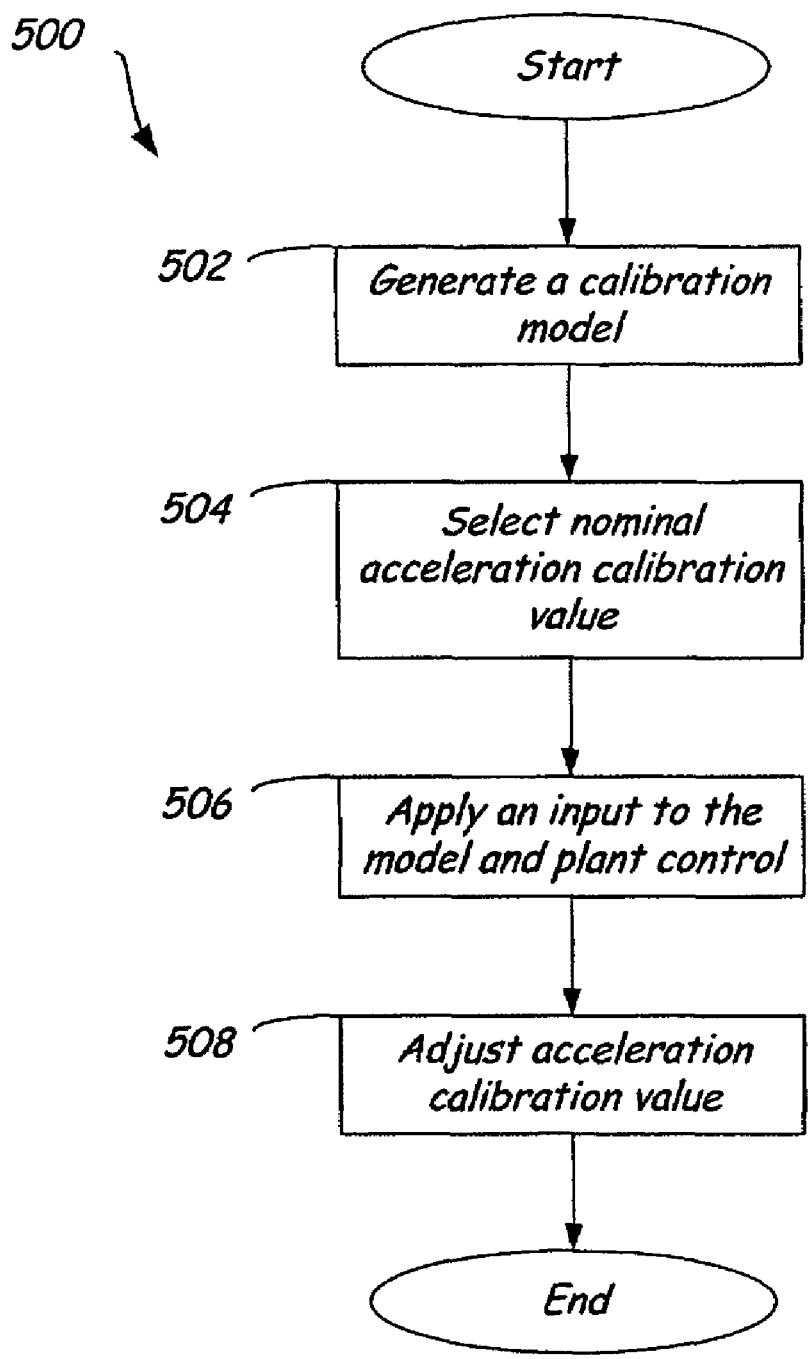
FIG. 7 is a flowchart that illustrates a method of calibrating a controller for the disc drive system of FIG. 2 according to one illustrative embodiment.

FIG. 7 illustrates a method 500 of performing an open loop $K_a$ calibration according to one illustrative embodiment. Method 500 includes a generation of a calibration model. This is represented by block 502. The calibration model provides a model of a disc drive control so that when an input signal is applied to the model, a desired position of a head of the drive will be calculated.

Method 500 also includes selecting an acceleration calibration constant, $K_a$, which is represented by block 504. The acceleration constant $K_a$ is selected as a nominal constant and it is applied as a gain to an input, which is then provided to a plant control. The plant control is used to position the interactive elements 14. Once the calibration model and the acceleration constant are selected, an input signal is applied to each of the model and the calibrated plant control. The outputs of the model and the plant control then illustratively compared to each other. This is represented by block 506. Referring to FIG. 6, the model output is illustrated as $X_{ref}$ and the plant control output is illustrated as position output 416. The difference between the model output and the plant control output is designated as $X_{err}$. If there is a difference between the model output $X_{ref}$ and the position output 416, the acceleration constant $K_a$ is adjusted. This is represented by block 508. When the difference between the model output $X_{ref}$ and the position output 416 is zero, the acceleration constant $K_a$ is properly adjusted. Thus, the introduction of the feedback terms through $K_v$ and $K_x$, added to the feed-forward signal, that accomplish accurate $K_a$ calibration by compensating for the low frequency plant response.

Figure 8:
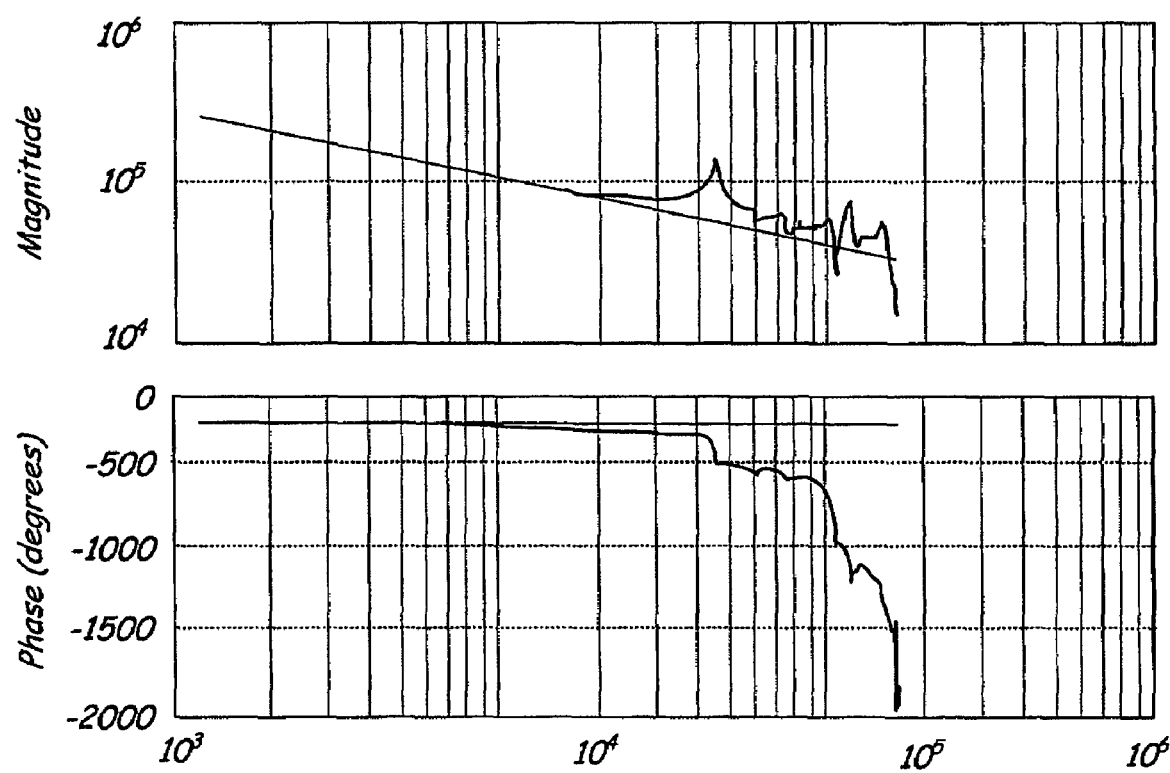
FIG. 8 is an illustration of a plant bode plot of the actual response from an actuator compared to an actuator model of a disc drive control system similar to that illustrated in FIG. 2.

Referring again to block 504, one portion of the method 500 includes generation of a calibration model of the type described above as model 406 of system 400. In one illustrative embodiment, the generating the model includes generating a nominal $k_{lump\_n}$. The nominal $k_{lump\_n}$ is illustratively selected by using a $$\frac{k_{lump}}{s^2}$$

a prototype and curve fitting the prototype to a plant bode at low frequency. FIG. 8 illustrates a plant bode plot from which the $k_{lump\_n}$ value can be selected according to one illustrative embodiment. The plot represents a plant bode plot of disc drive systems. The $k_{lump\_n}$ value is illustratively obtained by approximating the response of a disc drive system as shown in the plant bode. The $k_{lump\_n}$ value is thus extracted from the plant bode and used for example in model 104 or model 406 of the calibration systems discussed above.

Figure 9:
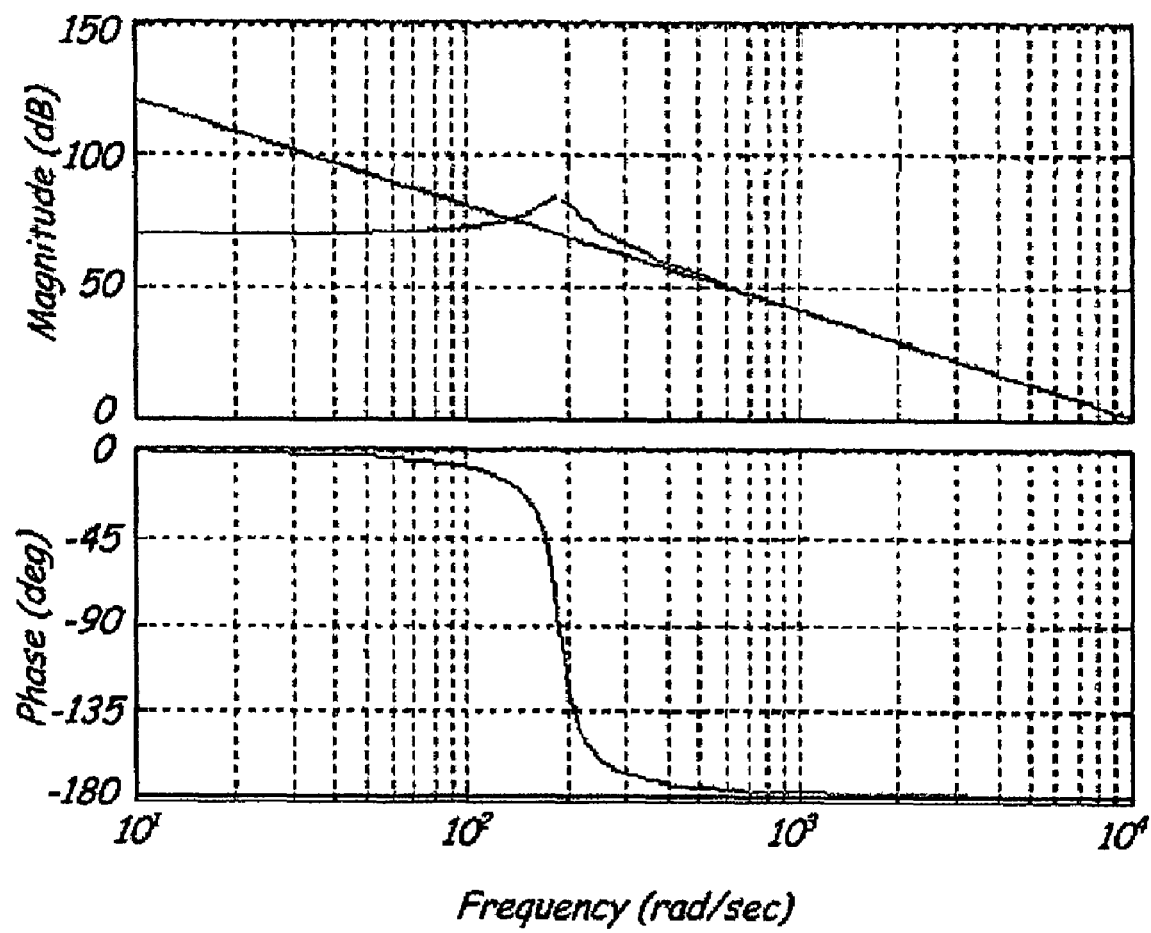
FIG. 9 is a bode plot that illustrates low frequency response of a plant model that compensates for losses at low frequency.

FIG. 9 illustrates a plant bode plot from which the $k_{lump\_n}$ value can be selected according to another illustrative embodiment. The plot represents a plant bode plot of disc drive systems that compensate for low frequency losses. The $k_{lump\_n}$ value is obtained by approximating the response of a disk drive system, by including position and velocity factors, as discussed above. The resultant model can be provided to model 104 of calibration system 100 so that calibration system 100 can account for low frequency response.

The embodiments discussed above provide significant advantages. Reliable calibration systems and methods provide improved performance in hard disc drive production and operation by minimizing the correction needed after a seek operation has been performed. Experimental results comparisons against the prior art indicate improvements in key positioning metrics by up to 50%. In addition, the use of feedback such as the position and velocity during normal operation, that is, outside of calibration, can result in improved control of the actual. Further, by allowing for the tuning of the $K_v$ and $K_x$, control of the actuator during normal operation can be further improved.

It is to be understood that even though numerous characteristics and advantages of the various embodiments have been set forth in the foregoing description, together with details of the structure and function of various embodiments, this disclosure is illustrative only, and changes may be made in detail, especially in matters of structure and arrangement of parts within the principles of the present embodiments to the full extent indicated by the broad general meaning of the terms in which the appended claims are expressed. For example, the particular elements may vary depending on the particular application for the controller while maintaining substantially the same functionality without departing from the scope and spirit of the present embodiments. In addition, although an embodiment described herein is directed to calibrating a controller for controlling the position of interactive elements relative to data storage media in a data storage system, it will be appreciated by those skilled in the art that the teachings of the present embodiments can be applied to other systems that utilize actuator positioning without departing from the scope and spirit of the present embodiments.

What is claimed is:

1. A method, comprising:
   calibrating an actuator controller using an open loop seek operation by compensating for a low frequency response to reduce the velocity at the end of the open loop seek operation;
   creating a model of the actuator response separate from the actuator control and applying an input signal to the model;
   feeding the input signal forward to the actuator control; and
   comparing an output from the model with a position value of the actuator to calculate a difference between the model output and the actuator position value.

2. The method of claim 1, wherein compensating for the low frequency response includes tuning the input signal provided to the actuator control by adding a feedback signal indicative of the actuator control.

3. The method of claim 2, wherein tuning the input signal further includes iteratively adjusting the feedback signal.

4. The method of claim 2, wherein adding a feedback signal includes adding a feedback signal indicative of the position of the actuator.

5. The method of claim 2, wherein adding a feedback signal includes adding a feedback signal indicative of the velocity of the actuator.

6. The method of claim 1 and further comprising:
   providing a nominal acceleration constant; and
   adjusting the nominal acceleration constant to reduce the difference between the model output and the actuator position value.

7. The method of claim 1, wherein creating a model of the actuator control includes creating the model based upon a curve fit of a plant bode at low frequency.

8. The method of claim 1 and further comprising:
   applying the feedback signal to the actuator control after calibrating the actuator controller.

9. A circuit, comprising:
   an actuator control that receives an input signal and provides a signal having an adjustable gain indicative of a nominal acceleration constant to control the position of an actuator;
   a model of the actuator, separate from the actuator control, configured to receive the input signal and provide an output indicative of a desired position of an actuator in response to the input signal, wherein the output of the model is compared to a signal indicative of the actual position of the actuator; and
   wherein the circuit is configured to calibrate the actuator control in an open loop seek operation by compensating for low frequency response.

10. The circuit of claim 9, and further comprising:
    a feedback signal indicative of the low frequency response added to the input signal received by the actuator control.

11. The circuit of claim 10 wherein the feedback signal is indicative of the position of the actuator.

12. The circuit of claim 10, wherein the feedback signal is indicative of the velocity of the actuator.

13. The system of claim 9, wherein the model is selected to curve fit a plant bode measurement at low frequency.

14. A method, comprising:
    applying a nominal acceleration constant to an input signal for an actuator control; and
    tuning the acceleration constant for an open loop control operation to compensate for low frequency response of the actuator during the open loop control operation, including:
      creating a model of the actuator response separate from the actuator control and applying the input signal to the model; and
      comparing an output from the model with a position value of the actuator to calculate a difference between the model output and the actuator position value.

15. The method of claim 14 and further comprising:
    tuning the input signal by adding a position signal indicative of the position of the actuator.

16. The method of claim 14 and further comprising:
    tuning the input signal by adding a velocity signal indicative of the velocity of the actuator.

17. The method of claim 14, wherein applying the nominal acceleration constant includes selecting the nominal acceleration constant based on a plant bode at low frequency.

18. The method of claim 14, wherein tuning the acceleration constant includes tuning the acceleration constant to reduce the velocity of the actuator at an end of the open loop control operation.

* * * * *